Dec. 1, 1925.  
E. FERRY ET AL  
1,563,842  
COMBINATION BRAKE AND JACK MECHANISM FOR AUTOMOBILES  
Filed May 7, 1925  
3 Sheets-Sheet 1
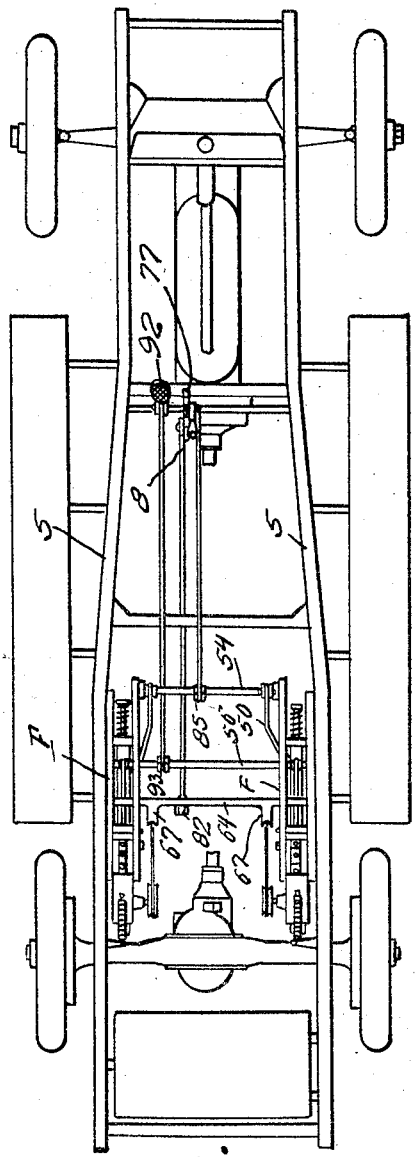
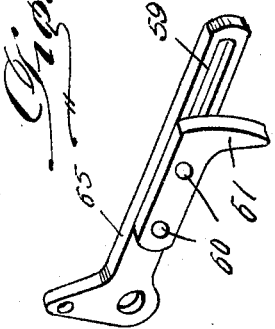
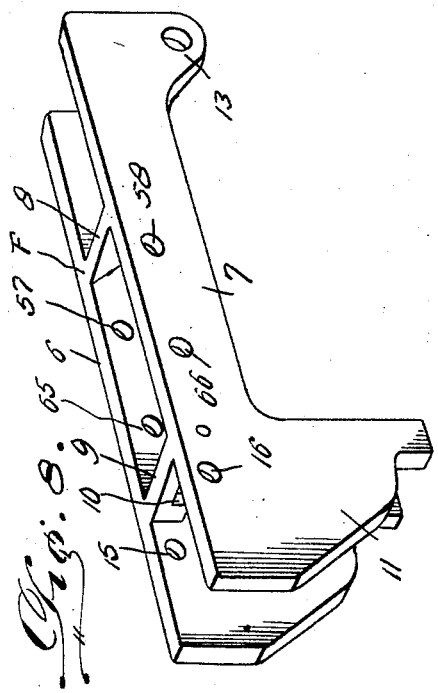
Inventors  
Elmer Ferry,  
Cora Ferry,  
By Clarence A. O'Brien  
Attorney Dec. 1, 1925.  1,563,842
E. FERRY ET AL
COMBINATION BRAKE AND JACK MECHANISM FOR AUTOMOBILES
Filed May 7, 1925    3 Sheets-Sheet 2
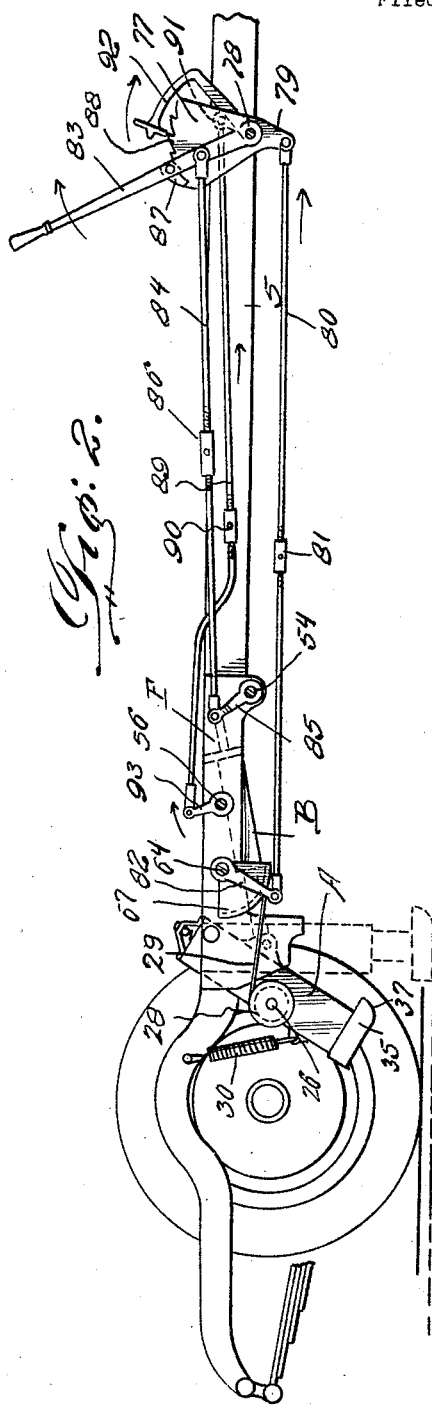
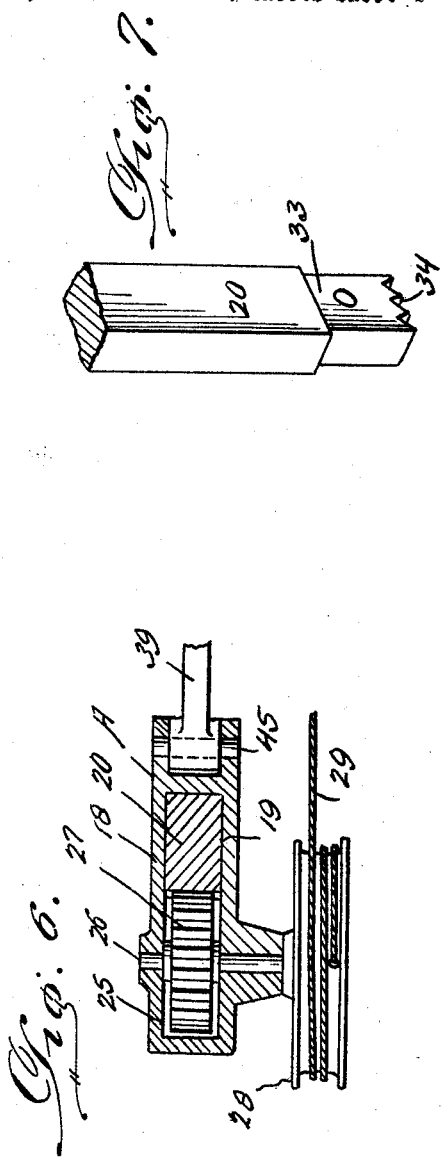
Inventors
Elmer Ferry,
Cora Ferry,
By
Attorney Dec. 1, 1925.                                                    1,563,842
                      E. FERRY ET AL
         COMBINATION BRAKE AND JACK MECHANISM FOR AUTOMOBILES
                    Filed May 7, 1925           3 Sheets-Sheet 3
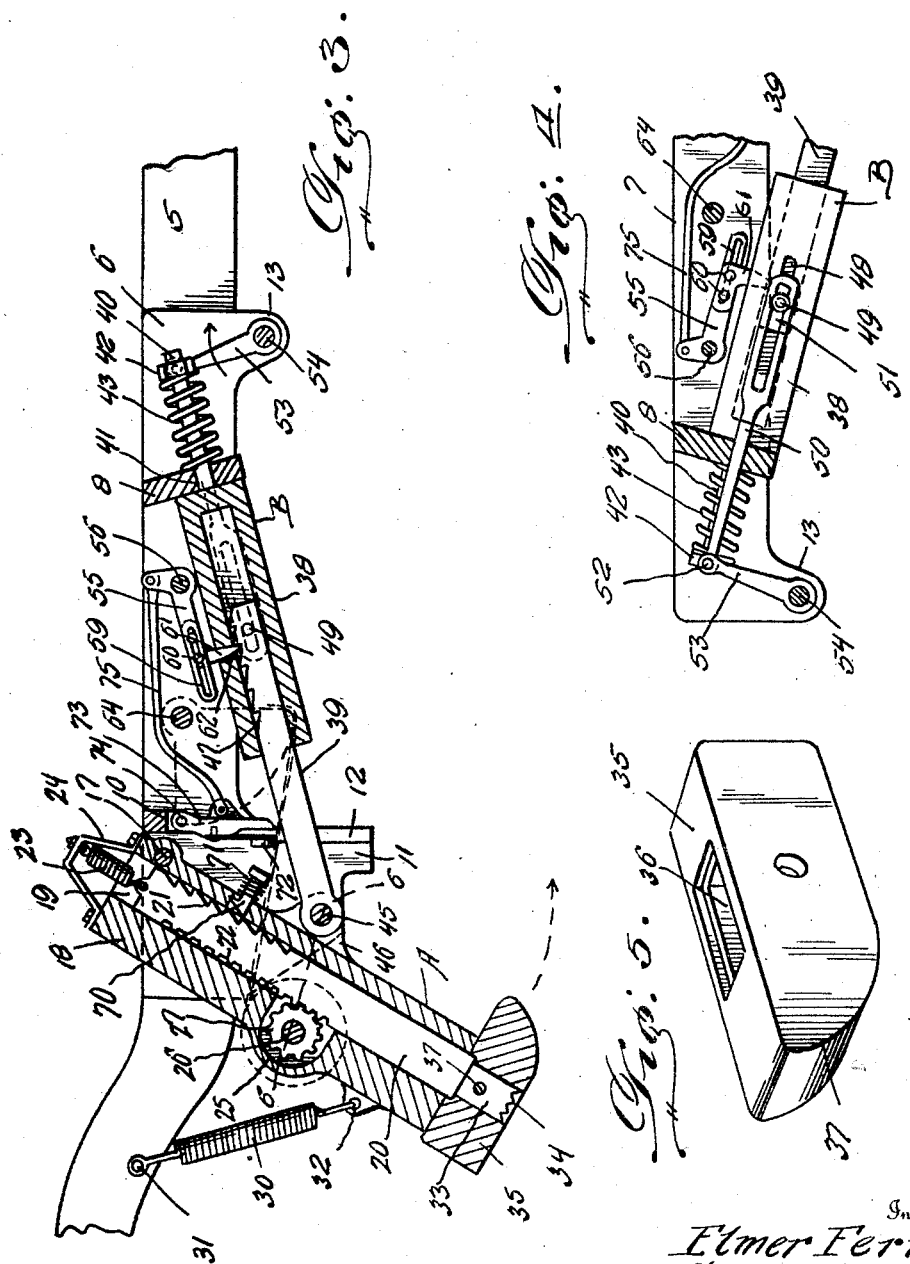

Patented Dec. 1, 1925.

1,563,842

UNITED STATES PATENT OFFICE.

ELMER FERRY AND CORA FERRY, OF BUFFALO, NEW YORK.

COMBINATION BRAKE AND JACK MECHANISM FOR AUTOMOBILES.

Application filed May 7, 1925. Serial No. 28,703.

*To all whom it may concern:*

Be it known that we, ELMER FERRY and CORA FERRY, citizens of the United States, and residents of Buffalo, in the county of Erie and State of New York, have invented certain new and useful Improvements in Combination Brake and Jack Mechanisms for Automobiles, of which the following is a specification.

The present invention relates to a combination brake and jack mechanism for automobiles, and has for its principal object to provide a structure, which may be conveniently and easily brought into play for causing a dragging action on the roadway, for breaking the speed of the automobile.

Another important object of the invention is to provide a tractor of this nature which may be conveniently and easily brought into play for jacking up the rear end of the automobile when desired, for a purpose.

A still further important object of the invention is the provision of a member pivotally mounted on the chassis of an automobile, and normally held in an inclined position, said member including a pair of telescopically associated sections, one of which may be extended in relation to the other for causing a dragging or jacking action, said member being associated with means for operation thereof and said means being controllable from a convenient position such as from the driver's seat of the automobile.

Another important object of the invention is the provision of a mechanism of this nature, which is simple in its construction, strong, durable, inexpensive to manufacture, reliable and efficient in operation, not likely to become easily out of order, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

The embodiment of the invention which we are about to disclose in detail is given merely by way of example, and it is to be understood that numerous changes in the details of constructions, and in the combination and arrangement of parts may be resorted to, without departing from the spirit or scope of the invention as herein described and shown, and that we are limited only as hereinafter claimed.

In the drawing:

Figure 1 is a top plan view of an automobile chassis with our improved mechanism associated therewith, Figure 2 is a fragmentary longitudinal section therethrough on an enlarged scale.

Figure 3 is a fragmentary enlarged vertical longitudinal section through a portion of the mechanism, Figure 4 is another fragmentary enlarged vertical longitudinal section, Figure 5 is an enlarged detail perspective view, showing one of the drag shoes, Figure 6 is an enlarged section, taken substantially on the line 6—6 of Figure 3, Figure 7 is a perspective view of the lower end of one of the inner sections of the swingable members, Figure 8 is a perspective view of one of the frames, and Figure 9 is a perspective view of one of the pawls and the supporting levers.

Referring to the drawings in detail, it will be seen that we have illustrated the chassis of an automobile or any other vehicle, which in the present instance, consists, among other elements, of a pair of longitudinally extending sides 5, to each of which is fixed a frame F. As the mechanisms associated with the frames F are identical, we will only describe those in connection with one frame, for the purpose of brevity and simplicity. Each frame F includes a pair of sides 6, and 7, which are held in spaced parallel relation, by a partition 8 and a cross member 9. The partition 8 is disposed diagonally of the side 6, and the under edge of the cross member 9 is provided with a centrally located notch 10. The rear ends of the sides terminate in depending plates 11, which are provided on their inner surfaces, adjacent their forward edges with vertically disposed stop ribs 12, the purpose of which will appear later. The plate 7 is provided, at its forward end with a depending apertured ear 13.

The sides 6 and 7 are provided with aligned openings 15 and 16 respectively, disposed rearwardly of the cross member 9, for receiving a fulcrum pin 17. This pin 17 extends through an opening provided in the outer section 18 of a swinging member indicated generally by the letter A. This outer section 18 is provided with a longitudinally extending bore 19, for slidably receiving the inner section 20 of the swingable member A. The forward edge of the inner section 20 is provided with ratchet teeth 21, and the rear edge is provided with rack teeth 22. A spring 23 has one end attached to the upper end of the section 20 and its other end attached to the upper end of the outer section 18, through the intermediacy of a bracket 24, and this spring is tensioned to normally hold the inner section retracted in the outer section, that is, in the position shown clearly in Figure 3 of the drawings. A recess 25 is provided in the outer section 18 and communicates with the longitudinally extending bore 19 at an intermediate point. A shaft 26 is journaled through the outer section 18 and extends across the recess 25. A rack gear 27 is fixed on this shaft 26 within the recess, and meshes with the rack teeth 22. On the outer end of the shaft 26 there is fixed a pulley 28 about which is adapted to wind a cable 29, which has one end fixed to the pulley. This cable is normally so wound about the pulley 28 that when it is pulled therefrom to unwind therefrom, said pulley is rotated, so as to actuate the gear 27 to extend the section 20 below the lower or free end of the section 18. A spring 30 is attached at its upper end to the chassis of the automobile as at 31 and at its lower end to an ear 32, on the outer section 18 of the swingable member A, and this spring is so tensioned as to hold the swingable member in a position to incline downwardly and rearwardly in relation to the chassis, as is clearly shown in Figures 2 and 3 of the drawings. The lower end of the section 20 is reduced, as at 33, and has its terminal face corrugated as at 34. A shoe 35 is provided with an opening 36 extending vertically therethrough for receiving the reduced portion 33, and a pin or the like 37 may be passed through the shoe and through the reduced portion for attaching the shoe to the lower end of the inner section 20. This shoe has its forward end bevelled, as at 37. A telescopic member B includes the outer section 38 and the inner section 39. The outer section 38 has formed on one end a shank 40 which extends through an opening 41 in the partition 8. A stop 42 is provided on the shank adjacent its end and a spring 43 is disposed between the stop 42 and the partition 8, for normally holding the upper end of the outer section 38 in abutment with the partition 8. The inner section 39 is slidable in the outer section 38 and has its lower end pivoted as at 45, between ears 46 provided on the outer member 18 of the swingable member A. The upper edge of the inner section 39 is provided with ratchet teeth 47. The outer section 38 is provided with a longitudinally extending slot 48, through which extends a pin 49 projecting from the inner section 39. A link 50 is provided with a slot 51, which also receives the pin 49, and the forward end of this link is pivotally engaged as at 52 with a crank 53, on a shaft 54, journaled in the openings of the ears 13 of the two frames F. When the shaft 54 is rocked, the crank 53 is swung, referring to Figure 4, in a counter-clockwise direction, thereby pulling the link 50 so that when the end of the slot 51 engages the pin 49, the inner section 39 is drawn into the outer section 38 of the telescopic member B, thereby swinging the member A forwardly to a vertical position, at which time the outer section 18 abuts against the stop ribs 12.

A lever 55 is pivoted intermediate its ends on a pin 56, which is journaled in the openings 57 and 58 of plates 6 and 7 respectively of the frame F. One arm of the lever is provided with a slot 59, for receiving pins 60 which extend from a pawl 61, thereby slidably mounting this pawl on the lever. The pawl 61 extends through an opening 62 provided in the outer section 38 of the member B, and engages with the ratchet teeth 47, so that when the swingable member A is swung to a vertical position, as just described, it will be maintained in this position by the engagement of the pawl 61 with the ratchet teeth 47. A shaft 64 is journaled through the openings 65 and 66 of plates 6 and 7 respectively of the frames F, and has cranks 67 formed thereon. The cable 29 is attached to the respective crank 67, so that upon the rocking of the shaft 64, when the swingable member A is in a vertical position, the inner section 20 thereof will be projected from the outer section 18, as previously indicated. A pawl 70 is slidable through the outer section 18 for engagement with the ratchet teeth 21 and is normally held out of engagement therewith by a spring 71. However, when the swingable member is in its vertical position, this pawl engages the end of a stronger spring 72, than spring 71, which causes the pawl to engage the ratchet teeth 21, and therefore, when the section 20 has been projected, it will remain in its projected position, because of the engagement of the pawl 70 with the ratchet teeth 21. The spring 72 is mounted on an arm 73, pivoted as at 74, in the notch 10. A rod 75 is pivotally connected with an intermediate portion of the arm 73 and to the other arm of the lever 55.

A segment 77 is swingable on a shaft 78, and at its lower end is provided with a crank extension 79 to which is attached a rod 80, having a turnbuckle adjustment 81 therein. The rear end of this rod 80 is attached to the crank 82 on the shaft 64. A lever 83 is swingable on the shaft 78. A rod 84 is pivotally attached to an intermediate portion of the lever 83 and to a crank 85 on the shaft 54. This rod 84 is provided with a turn buckle adjustment 86. The lever 83 has a pawl 87 pivoted thereto for engaging ratchet teeth 88 provided on the upper arcuate edge of the segment 77. A rod 89, having a turn buckle adjustment 90 therein, is pivoted, at one end, to a crank 91 operable by a foot pedal 92. The rear end of the rod 89 is pivotally attached to a crank 93 on the shaft 56.

Assuming that the parts are in their normal positions, as they are shown in the drawing, it will be seen that by swinging the lever 83 in a clockwise direction, as is indicated by the arrow, in Figure 2, the rod 84 will be moved forwardly, thereby swinging the crank 85 and rocking the shaft 54, in a clockwise direction. This causes a similar swinging of the crank 53, so as to pull upon the link 50, and when the end of the slot 51 engages the pin 49, the inner section 39 of the member B will be retracted or pulled into the outer section 38, thereby swinging the member 18 to a vertical position as previously indicated. The lever 83 is then swung in a counterclockwise direction, at which time the pawl 87 engages the forward tooth of the ratchet teeth 88, so as to rock the segment 77 also in a counterclockwise direction. The rocking of this segment 77 causes the swinging of the crank extension 79 to pull the rod 80, in the direction shown by the arrow in Figure 2. The crank 82 will therefore be swung in a counterclockwise direction, and rock the shaft 64 in the same direction, and therefore, the cable 29 will be pulled to unwind from the pulley 28 for causing the extending of the section 20 of the member A as previously indicated in detail. The member A is now in the position indicated by dotted lines in Figure 2 with the rear wheels raised from the ground, so that the shoes will drag and act as a brake, if the vehicle is moving, or the mechanism may be merely functioning as a jack, for raising the rear wheels from the ground. If the foot pedal 92 is rocked, in the position indicated by the arrow in Figure 2, the rod 89 will be pulled in the direction indicated by the arrow, that is, forwardly, thus rocking the crank 93, and shaft 56, in a clockwise direction. This will cause the swinging of the lever 55 in a similar direction, and by referring particularly to Figure 3 of the drawing, it will be seen that the pawl 61 will be disengaged from the ratchet teeth 47 and the arm 73 will be swung to release the spring 72 from the pawl 70, thereby allowing the spring 71 to move this pawl out of engagement with the ratchet teeth 21, and thus the spring 23 will retract the section 20 to its normal position, and the spring 30 will swing the member A to its normal position, at the same time extending section 39 from section 38 of the member B. The pawl 87 may then be released, and the lever 83 swung to its normal position. The pin and slot connections 49 and 51, allow the movement of the lever 83 as indicated.

When the mechanism is being used as a brake, and the member A is in its vertical position and the section 20 is extended, and the shoe 35 should strike a rock, a stone or any other obstacle, the spring 43 will allow the member A to swing rearwardly, so as to prevent any breakage. In this swinging of the member A is indicated, the pawl 61 must move, and it is for this reason that the pin and slot connections 60 and 59 is provided. In icy or snowy weather, it is preferable to remove the shoes 35, so that the corrugated terminals 34 may engage with the ice and snow on the ground, thus greatly enhancing the retarding action of the mechanism when used as a drag brake.

It is thought that the construction, operation, and advantages of the invention will now be clearly understood, without a more detailed description thereof. The present embodiment of the invention which we have described in detail, attains all of the features of advantage enumerated in the statement of the invention and the above description. It will be readily apparent that the device functions with considerable ease and accuracy and will be thoroughly reliable when used as a brake, and also as a jack.

Having thus described our invention, what we claim as new is:

1. In combination, a vehicle, a member including an outer section and an inner section telescopically associated, said inner section provided on one edge with ratchet teeth, and on its other edge with rack teeth, a rack gear journaled in the outer section for engaging the rack teeth, a pawl slidable in the outer section and engageable with the ratchet teeth, means for rotating the gear for extending the inner section, and means normally holding the inner section in a retracted relation to the outer section.

2. In combination, a vehicle, a member including an outer section and an inner section telescopically associated, said inner section provided on one edge with ratchet teeth, and on its other edge with rack teeth, a rack gear journaled in the outer section for engaging the rack teeth, a pawl slidable in the outer section and engageable with the ratchet teeth, means for rotating the gear for extending the inner section, means normally holding the inner section in a retracted relation to the outer section, means normally holding the pawl out of engagement with the ratchet teeth, means for swinging the member to an engaging position, and means operable when the member is in an engaging position for holding the pawl in an active position in relation to the ratchet teeth.

3. In combination, a vehicle, a telescopic member pivoted to the vehicle and including a pair of sections, means for extending one section in relation to the other, means for swinging the member to a vertical position, means normally holding the sections retracted in relation to each other, one of said sections provided with ratchet teeth, a pawl slidable through the other section, means for normally holding the pawl in an inactive position in relation to the ratchet teeth, a telescopic device including a pair of elements one extensible in relation to the other, the extensible element being attached to the member, and the other element being fixed to the vehicle, the extensible element being provided with ratchet teeth, a pawl extending through the non-extensible element and engageable with the extensible element, a lever on which the last mentioned pawl is mounted, a pivotally mounted arm, a link connecting the pivotally mounted arm and the lever, means for swinging the lever, said arm having thereon a spring, which abuts the first mentioned pawl when the extensible element is retracted in the other element, so as to place the first mentioned pawl in an active position in relation to the ratchet of the section of the member, and means for retracting the extensible element.

4. In combination, a vehicle, a telescopic member pivoted to the vehicle and including a pair of sections, means for extending one section in relation to the other, means for swinging the member to a vertical position, means normally holding the sections retracted in relation to each other, one of said sections provided with ratchet teeth, a pawl slidable through the other section, means for normally holding the pawl in an inactive position in relation to the ratchet teeth, a telescopic device including a pair of elements one extensible in relation to the other, the extensible element being attached to the member, and the other element being fixed to the vehicle, the extensible element being provided with ratchet teeth, a second pawl extending through the non-extensible element, a lever on which the second pawl is mounted, a pivotally mounted arm, a link connecting the pivotally mounted arm and the lever, means for swinging the lever, said arm having thereon a spring which abuts the first pawl when the extensible element is retracted in the other element, so as to place the first pawl in an active position in relation to the ratchet of the section of the member, means for retracting the extensible element, the second pawl being slidably mounted on the lever, a resilient connection between the non-extensible element and the vehicle, all in the manner and for the purpose specified.

5. In combination, a vehicle, a telescopic member including a pair of sections, one pivoted to the vehicle, and the other extensible toward the pivoted section, means normally holding the extensible section retracted in the pivoted section, means normally holding the member inclined rearwardly and downwardly from the vehicle out of engagement with the ground, a pawl and ratchet mechanism associated between the sections normally held in an inoperative position, a telescopic element including a fixed portion and an extensible portion associated with the fixed portion, said extensible portion being pivotally engaged with the pivoted section of the telescopic member, a pawl and ratchet mechanism associated between the portions of the telescopic element, means for retracting the extensible portion in relation to the fixed portion of the telescopic element, in order to swing the telescopic member to a vertical position, a member associated with the pawl and ratchet mechanism of the telescopic member for throwing them into active association upon the movement of said member to its vertical position, and means for releasing the pawl and ratchet mechanism of the telescopic element and simultaneously moving the member associated with the pawl and ratchet mechanism of the telescopic member to inoperative position.

6. In combination, a vehicle, a member pivoted to the vehicle comprising a pair of telescopically associated sections, means normally holding the member in a raised position, means normally holding the sections retracted in relation to each other, means for swinging the members to an active position comprising a lever, means for extending the sections, said last mentioned means including an actuating member comprising a segment having ratchet teeth, a pawl on the lever engageable with the ratchet teeth so that the lever is swung to swing the member, the ratchet teeth are passed over by the pawl, and when the lever is returned, the pawl engages the ratchet teeth to swing the segment, and extend the sections.

7. In combination, a vehicle, a member pivoted to the vehicle comprising a pair of telescopically associated sections, means normally holding the member in a raised position, means normally holding the sections retracted in relation to each other, means for swinging the members to an active position comprising a lever, means for extending the sections, said last mentioned means including an actuating member comprising a segment having ratchet teeth, a pawl on the lever engageable with the ratchet teeth so that the lever is swung to swing the member, the ratchet teeth are passed over by the pawl, and when the lever is returned the pawl engages the ratchet teeth to swing the segment, and extend the sections, means for holding the sections extended, means for holding the member in an active position, and a mechanism for releasing the last two mentioned means.

Signed at Buffalo in the county of Erie and State of New York this 29th day of April A. D. 1925.

ELMER FERRY.
CORA FERRY.